(12) United States Patent
Sedeffow

(10) Patent No.: US 8,351,498 B2
(45) Date of Patent: Jan. 8, 2013

(54) TRANSCODING VIDEO DATA

(75) Inventor: Peter Vassilev Sedeffow, London (GB)

(73) Assignee: Saffron Digital Limited, London (GB)

( * ) Notice: Subject to any disclaimer, the term of this patent is extended or adjusted under 35 U.S.C. 154(b) by 1020 days.

(21) Appl. No.: 12/330,782

(22) Filed: Dec. 9, 2008

(65) Prior Publication Data

US 2010/0034257 A1    Feb. 11, 2010

(30) Foreign Application Priority Data

Aug. 9, 2008  (EP) .................................... 08252659
Oct. 10, 2008  (EP) .................................... 08253317

(51) Int. Cl.
H04N 7/12    (2006.01)
(52) U.S. Cl. ......... 375/240.01; 375/240.02; 375/240.25; 375/240.26
(58) Field of Classification Search ............. 375/240.01, 375/240.02, 240.25, 240.26
See application file for complete search history.

(56) References Cited

U.S. PATENT DOCUMENTS 5,794,061 A *  8/1998  Hansen et al. .................... 712/1
2007/0230586 A1  10/2007  Shen et al.

FOREIGN PATENT DOCUMENTS

| EP | 1626557 A1 | 2/2006 |
|---|---|---|
| EP | 1786205 A1 | 5/2007 |
| WO | 0079801 A1 | 12/2000 |

OTHER PUBLICATIONS

Shen, B. et al, Caching Strategies in Transcoding-enabled Proxy Systesmf ro Streaming Media Distribution Networks, HP Laboratories Technical Report, XX, XX, Dec. 10, 2003, pp. 1-10, XP-002293154.

Sambe, Y. et al, High-speed Distributed Video Transcoding for Multiple Rates and Formats, IEICE Transactions on Information and Systems, pp. 1923-1931, XP-002516536.

* cited by examiner

Primary Examiner — Sath V Perungavoor
Assistant Examiner — Geepy Pe
(74) Attorney, Agent, or Firm — Richard M. Goldberg

(57) ABSTRACT

A transcoding procedure is shown for decoding coded video data and re-coding the video data. An input device (201) receives coded video data and a distribution device (304) supplies a copy of the input data to each of a plurality of transcoding processors. A control processor (305) is configured to instruct each transcoding processor to transcode a time-based segment of the input data and to combine the transcoded segments to produce transcoded output video data 20 Claims, 8 Drawing Sheets

TRANSCODING VIDEO DATA

CROSS REFERENCE TO RELATED APPLICATIONS

This application claims priority from European patent application number 08 252 659.1 filed Aug. 9, 2008 and European patent application number 08 253 317.5 filed Oct. 10, 2008, the entire disclosures of which are incorporated herein by reference in their entirety.

BACKGROUND OF THE INVENTION

1. Field of the Invention

The present invention relates to a method of decoding coded video data and re-coding said video data, in a process generally referred to as transcoding.

2. Description of the Related Art

Procedures for the downloading or streaming of video material are well known. When downloading, the whole of the file is transmitted before the file is played. Alternatively, when streaming, the material is viewed as the data is being transmitted. In either case, it is necessary for the receiving equipment to include appropriate decoding procedures (a CODEC) for decoding material, thereby allowing the material to be played.

Recently, there has been a trend towards receiving video material from many different sources and therefore it is possible for the material to conform to many differing coding techniques. Consequently, only a subset of this material may be available to a particular user if there are certain CODECs that are not locally available.

In order to render material playable without having the requisite CODEC, it is also possible to perform a transcoding operation in which the material is decoded and then re-coded to a different standard. As is known in the art, the decoding process is relatively inexpensive but coding procedures place higher demands on processing capabilities. Consequently, problems exist in terms of performing transcoding operations in short periods of time such that a user perceives the conversion as being substantially instantaneous, which may be considered as taking in the region of two seconds.

BRIEF SUMMARY OF THE INVENTION

According to an aspect of the present invention, there is provided a method of decoding coded video data and re-coding said video data (transcoding). The method involves receiving input coded video data; supplying a copy of the said input data to a plurality of transcoding processors; instructing each said transcoding processor to transcode a time-based segment of the input data; combining said transcoded segments; and supplying output transcoded video data.

DETAILED DESCRIPTION OF EMBODIMENTS OF THE INVENTION

Figure 1:
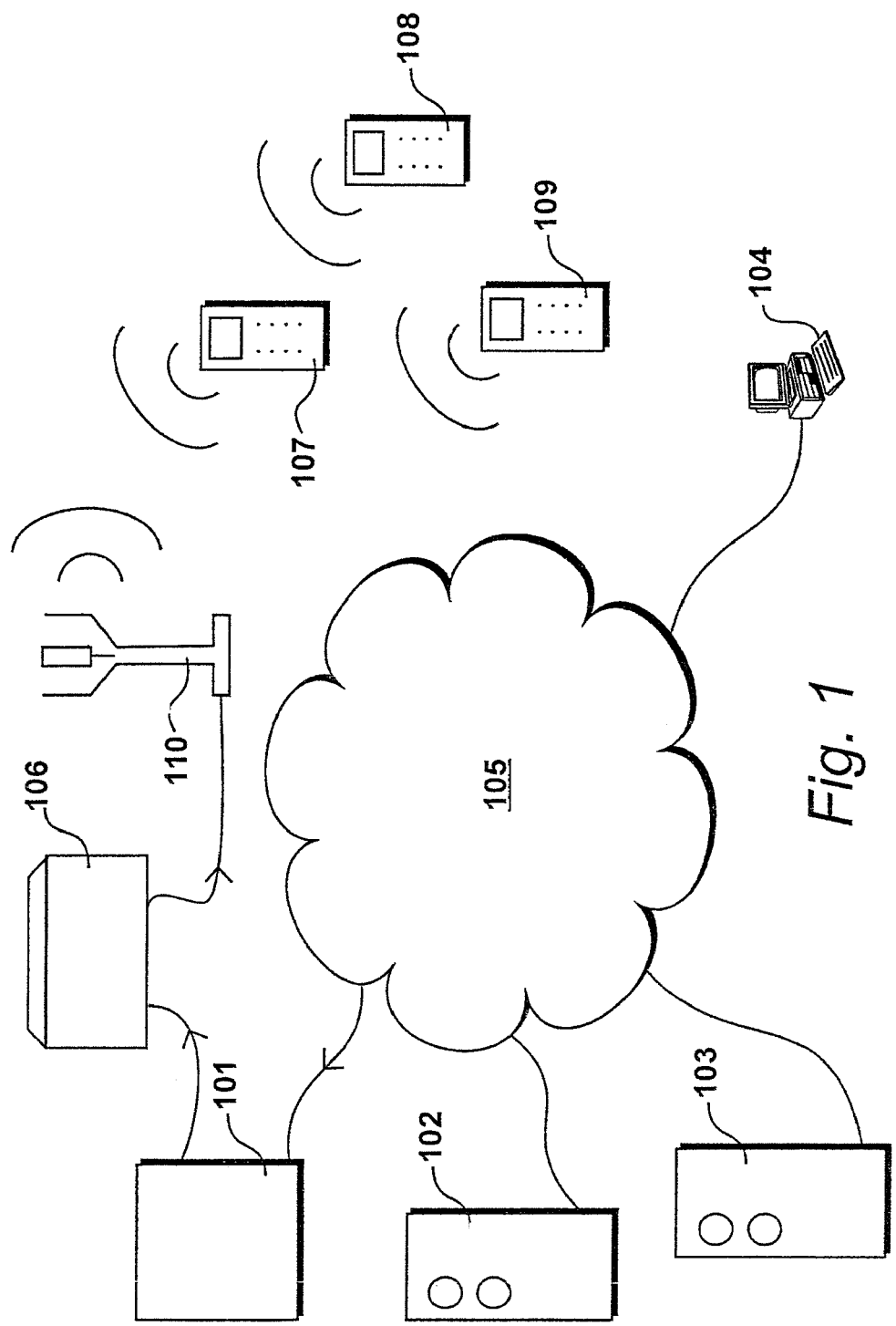
FIG. 1 shows an environment for transcoding video material.

An environment that includes a video processing station 101 is illustrated in FIG. 1. The video processing station 101 supplies video data from many accessible sources, including source 102 and source 103. These sources are accessible to anyone, usually without payment being made, but as such the supplier is not motivated to configure the downloadable or streamable material for every reception CODEC. Thus, it is possible that the material is viewable on a particular computing system (such as an Apple Mac system) but would generally not be displayable on other computing systems, such as a LINUX system. Further problems of this type exist if the material is to be displayed on mobile devices where additional constraints will exist in terms of screen definition and transmission bandwidth.

In this example, the sources are accessible via a conventional web browsing system, such as system 104. The video processing station 101 receives video assets from the accessible sources 102, 103 via the Internet 105. In addition, the video processing apparatus 101 is also connected to a mobile telephony service provider 106, that communicates with mobile devices 107, 108 and 109 via a network of transmitter base stations, such as transmitter 110.

It is also envisaged that transmission could occur to other types of devices connected to other networks, such as a high bandwidth optical network or a local radio network etc.

Figure 2:
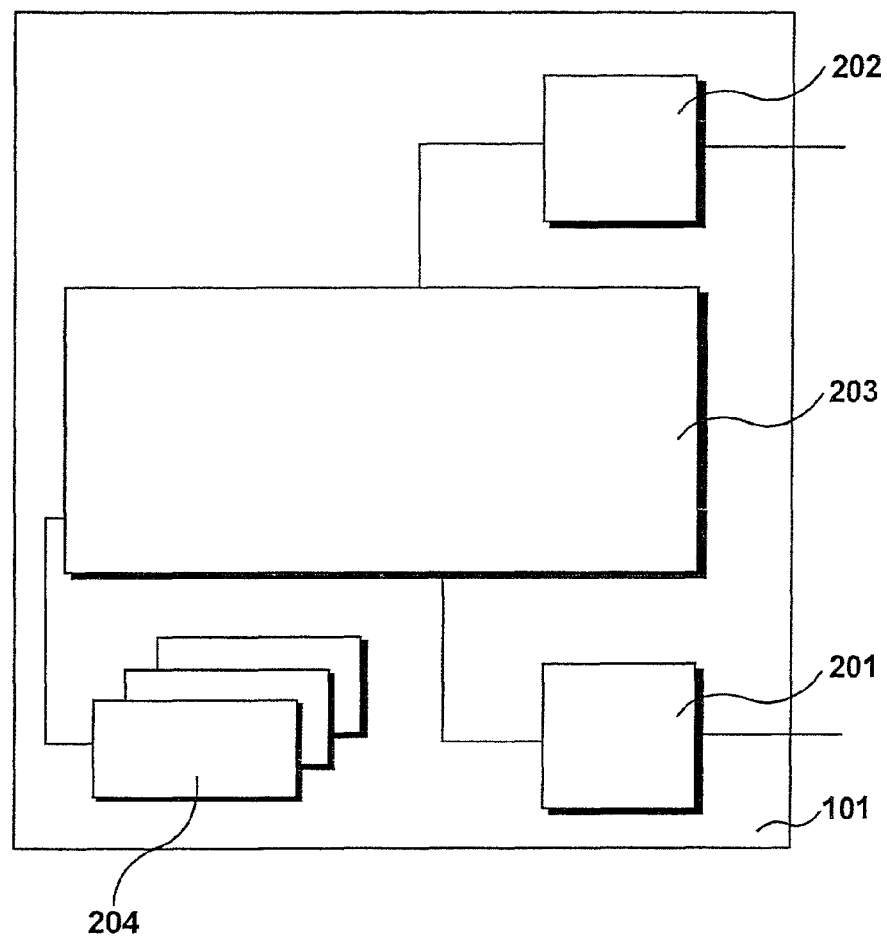
FIG. 2 shows a processing station identified in FIG. 1.

Video processing station 101 is detailed in FIG. 2. The video processing station 101 includes an Internet connected input device 201 for receiving video assets from Internet accessible servers (102, 103). In addition, the video processing station is provided with an output interface for sending transcoded copies of video assets to user devices, such as (but not exclusively) devices 104, 107, 108 and 109. The transcoding station also includes a transcoding system 203 configured to transcode video assets on demand. Thus, a video asset is received at input device 201, transcoded within transcoding system 203 and then conveyed to output interface 202 for transmission to the requesting device.

Having transcoded a video asset, it is possible for the transcoded version to be written to a solid state cache, such as cache 204 shown in FIG. 2 for illustrative purposes, preferably having a storage capacity of several terabytes. Thus, having transcoded an asset it is not necessary for this specific transcoding operation to be performed again while the transcoded copy remains in the cache 204.

Figure 3:
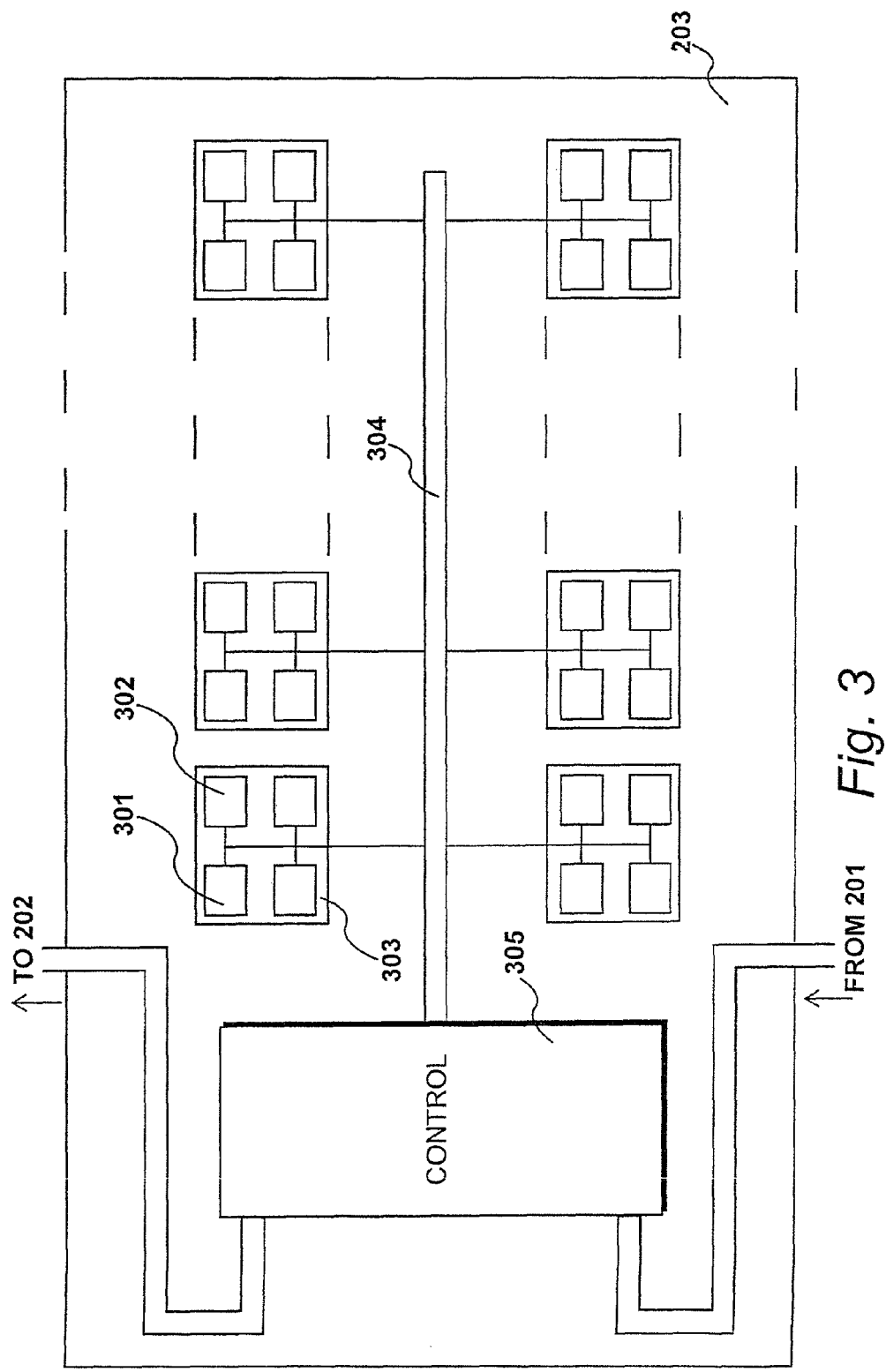
FIG. 3 details a transcoding system of the type identified in FIG. 2.

Transcoding system 203 is detailed in FIG. 3. The transcoding system 203 has a large number of individual transcoding processors 301, 302, 303, etc. Each transcoding processor is implemented as a processor core and in this example a total of four cores are available within each chip. A plurality of chips with associated circuitry are enclosed within an individual rack mounted server and within the transcoding system 203 a large number of interconnected servers are provided. This represents an example of many possible configurations and preferably many individual processors are connected to a high bandwidth bus 304 or similar communication network.

In a specific preferred embodiment, a total of one hundred and sixty individual transcoding processes may be included within the transcoding system, thereby providing sufficient processing power for a video asset lasting tens of minutes when displayed in real-time to be transcoded within four seconds. However, it can be appreciated that the number of processors provided within any system will be dependent upon the processing power of each individual processor and the level of processing required for each individual video segment.

It has also been appreciated that the segmentation of a video asset may introduce undesirable artefacts when the video segments are recombined. Consequently, for relatively short video clips, it is preferable for a subset of the available processors to be instructed so as to reduce the level of segmentation to a minimum while still performing a transcoding process over a period of a few seconds. Thus, it is possible for the segmentation to be optimised so as to reduce the number of artefacts introduced while ensuring that the transcoding operation takes place within a relatively short time frame.

The transcoding system includes a control processor 305 that receives input data from input device 201 and supplies transcoded data to output interface 202. Having received a video asset, the control processor 305 supplies a copy of the total video asset to each of the transcoding processors 301, 302 etc. Thus, in a preferred embodiment, the control processor 305 broadcasts the video asset over bus 304, resulting in a copy of the asset being retained at each individual processor 301 to 302. In this way, it is not necessary for the control processor 305 to implement a procedure for subdividing the video asset, which could place a significant burden upon the control processor 305.

It has been appreciated that some file formats require the whole file to be considered before it is possible to identify individual frames therein. It is also appreciated that encoding techniques of this type will tend to become more sophisticated, given ongoing requirements to effect greater levels of compression upon large video assets. Thus, each individual transcoding processor 301, 302 is placed in a position where it is possible for the processor to read and process the whole of the video material.

To perform the transcoding operation at high speed, each transcoding processor 301, 302 etc is instructed by the control processor 305 to transcode a time-based segment of the asset to produce transcoded segments. Thus, control processor 305 is required to identify the total duration of the video asset and then divide this total duration by the total number of transcoding processors available (such as one hundred and sixty in an example embodiment). Thus, for video assets having durations that are greater than a predetermined duration, all of the available (one hundred and sixty) transcoding processors are deployed. However, for smaller clips, fewer transcoding processors may be selected as a subgroup. Having identified the total number of transcoding processors available and the total duration of the video asset, the total duration is divided by the number of processors available so as to identify specific durations for each processor to process.

For the purposes of illustration, a video asset may have been identified that has a total duration of one hour, forty-six minutes and forty seconds. This is equivalent to a duration of six thousand, four hundred seconds which when divided across one hundred and sixty processors results in a forty second segment being transcoded by each of the processors. Thus, following this example, a transcoding processor 301 would be required to produce a segment of output video material from timecode 00:00:00 to timecode 00:00:40. Processor 302 would be instructed to transcode the next segment and would therefore receive instructions to transcode from frame 00:00:41 to 00:01:20. Thus, each individual transcoding processor within the transcoding system would be allocated its unique forty second segment, such that the transcoding procedures are completed in parallel and then reassembled at the control processor 305, for transmission via the output interface 202.

Figure 4:
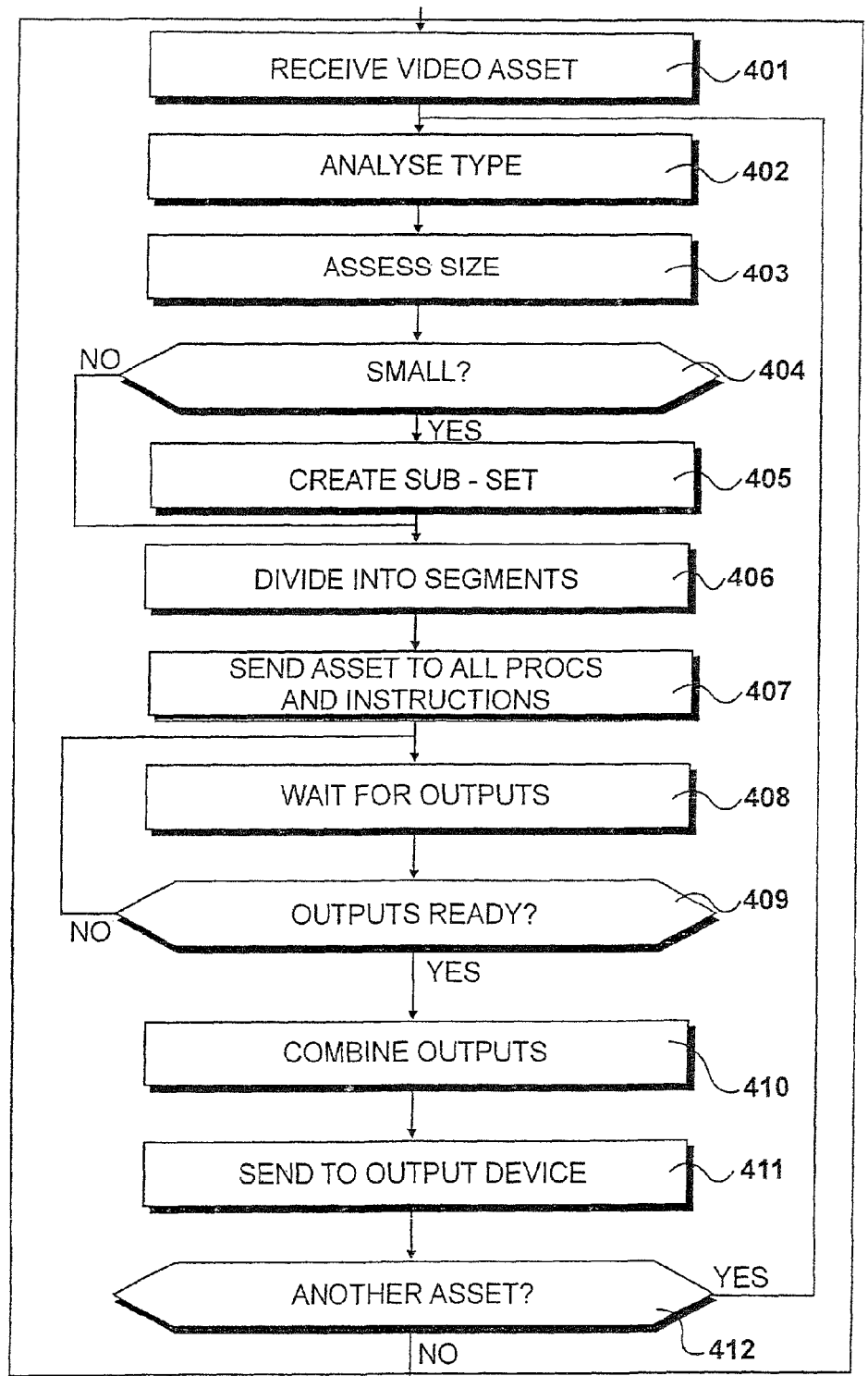
FIG. 4 shows procedures performed by a control processor identified in FIG. 3.

Procedures performed by the control processor 305 are detailed in FIG. 4. At step 401 a video asset is received and at step 402 an analysis is performed in order to identify the coding type of the video asset. Thereafter, at step 403 an assessment is made as to the size of the video asset. Thus, if the video asset is considered to be small in duration it is only necessary for a subset of the available processors to be deployed. Alternatively, if the asset duration is considered not to be small, all of the processors will be deployed. Consequently, a question is asked at step 404 as to whether the duration is small and when answered in the affirmative a subset of processors are created at step 405.

At step 406 the video asset duration is divided into segments. It should be noted that these segments are identified by timecode frames of output video and do not represent a segmentation of the received video material. Consequently, at step 407 the entire asset is sent to all of the processors (or subset of processors) along with instructions for the transcoding process.

At step 408 a wait state is entered while the transcoding procedures are performed with a question being asked at step 409 as to whether the outputs are ready. When answered in the negative, the wait state at 408 is entered again but ultimately the question asked at step 409 will be answered in the affirmative resulting in the outputs being combined at step 410. Thereafter at step 411, the combined transcoded video is supplied as an output file to the output interface and a question is then asked at step 412 as to whether another asset is available. Consequently when answered in the affirmative control is returned to step 402.

Figure 5:
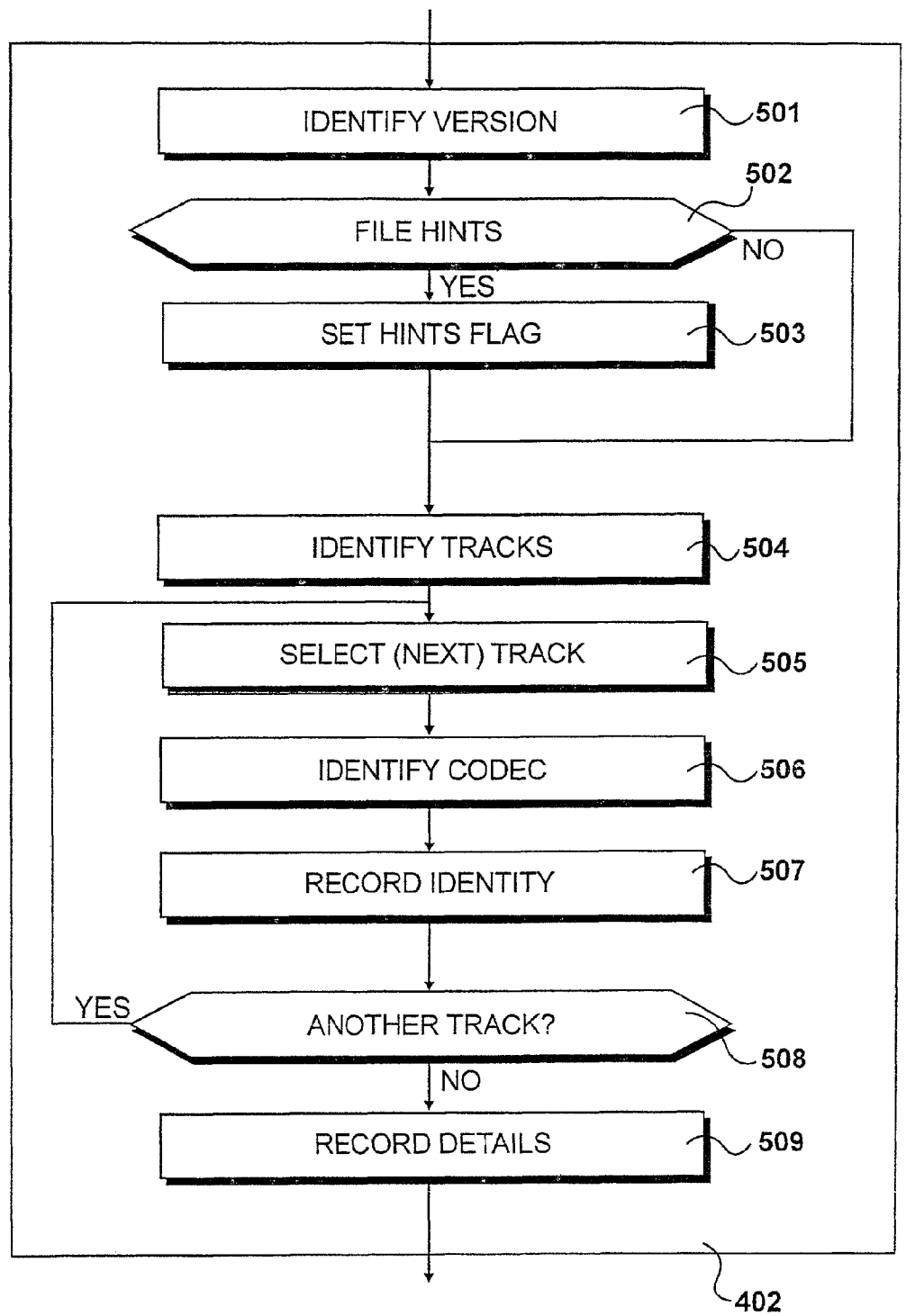
FIG. 5 shows procedures for analysing the type of video asset as identified in FIG. 4.

Procedures 402 for analysing the type of the video asset are detailed in FIG. 5. Video files often take the form of a container within which there are a plurality of boxes or atoms arranged in a tree-like structure. These containers have been enhanced as various versions are released therefore at step 502 the version of the container is identified.

Some containers contain hints to assist when streaming video data. Thus, at step 502 a question is asked as to whether the file contains hints and when answered in the affirmative a hints flag is set at step 503 such that the transcoded data will also include hints.

At step 504 tracks are identified and at step 505 a track is selected. For the selected track the particular CODEC used is identified at step 506 and a record is made of this identified CODEC at step 507. At step 508 a question is asked as to whether another track is to be processed and when answered in the affirmative control is returned to step 505.

Typical CODECs for video material are H.264, MPEG 4 and H.263. Furthermore, for each video track it is necessary to identify the width and the height of the video material and some specifications, such as H.264 and MPEG 4 will include a profile definition. The profile does not actually change the decoding process but it does provide an indication of the type of material to come. Other CODEC identification parameters concern the size of the decoding buffer and bit rate.

In addition to transcoding the video material, the audio material is also transcoded therefore similar procedures must be performed upon the audio tracks, hence the requirement at step 508 to consider other tracks. For sound channels it is necessary to identify whether there is one mono track or two stereo tracks and it is also necessary to identify the sample rate which typically lies between 8 KHz and 48 KHz.

At step 508 if the question is answered in the negative, the process continues to step 509 to record the details.

Figure 6:
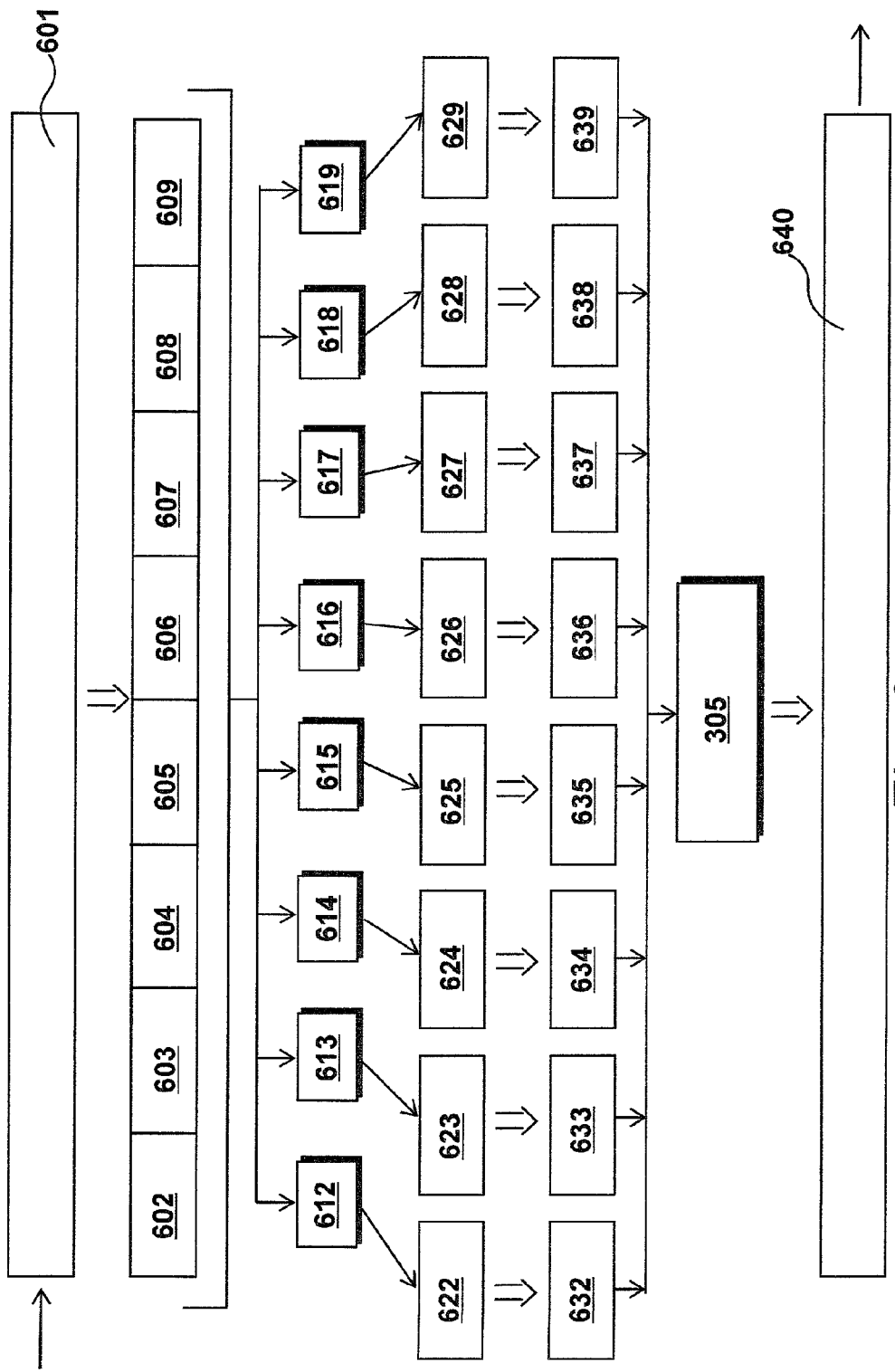
FIG. 6 details the transcoding process.

The transcoding process performed within the transcoding system 203 is illustrated in FIG. 6. The process is initiated by the reception of video footage 601 that has usually been compressed using compression techniques such as MPEG 4. Many specific compression procedures are available, each having their own dedicated CODEC and it is likely that new CODEC definitions will continue to be developed. However, the majority of these compression procedures use similar techniques for achieving video compression.

It is possible to compress each individual video frame using discrete cosine transforms or something similar to achieve spatial compression. This results in the generation of coefficients which may or may not be truncated to achieve a level of compression dependent upon the nature of the original material and dependent upon the degree of loss that may be tolerated.

Further compression (temporal compression) is achieved by comparing adjacent video frames such that the differences between frames are recorded instead of recording the entire frame. This type of compression works well with video given that the difference between most adjacent frames is relatively small, unless a change of scene has occurred.

The control processor is required to identify the type of compression that has occurred so as to determine the type of CODEC required in order to perform a decoding operation, along with a determination of the duration of the asset.

Having identified the duration of the asset, the original material 601 is processed as a plurality of segments, shown as 602 to 609. For the purposes of illustration, in this example, the original material 601 has been divided into a total of eight time-based segments of equal duration. In a preferred embodiment previously described, the total asset may be divided into a total of one hundred and sixty segments.

For the purposes of this illustration, eight individual transcoding processors 612 to 619 are provided. The control processor does not divide the unprocessed material and supplies appropriately sized portions to each of the transcoding processors. In the preferred embodiment, the control processor broadcasts the totality of the incoming video to all of the transcoding processors 612 to 619. Thus, each transcoding processor preferably retains a copy of the entire source material for subsequent decoding. The control processor instructs each individual transcoding processor to identify frames of input video from which an output segment is transcoded.

The transcoding process is initiated by firstly performing a decoding process such that each transcoding processor 612 to 619 produces a respective decoded segment of video material 622 to 629. Thus, assuming each transcoding processor is required to produce forty seconds of transcoded material, for the purposes of this illustration, it may be assumed that transcoding processor 613 is required to transcode forty seconds of output material from frame timecode 00:00:41 to 00:01:20.

Having decoded the material to produce segments 622 to 629, a re-coding operation is performed so as to convert the material into a form suitable for reception at the receiving device. Thus, from decoded video segments 622 to 629, re-coded segments 632 to 639 are produced.

Re-coded segments 632 to 639 are received at the control processor 305 which in turn reassembles the segments to produce output video data 640.

The majority of video assets will also include audio tracks and the digital representation of the audio material will be received as discrete samples and these samples may in turn be associated with timecode defining the position of frames within the video material. Thus, in a preferred embodiment, the audio samples are retained with the video material and processed within the same transcoding processor. Thus, the segmentation that divides the video material between the individual transcoding processors is re-deployed for the transcoding of the audio material such that at each stage, the audio material is processed with its associated video frames.

In a preferred embodiment, each transcoding processor identifies an instructed segment of the video asset and decodes data from that time segment. However, in addition, under many circumstances, the transcoding processor will decode some frames before the defined segment and/or after the defined segment to facilitate the video decoding process.

Figure 7:
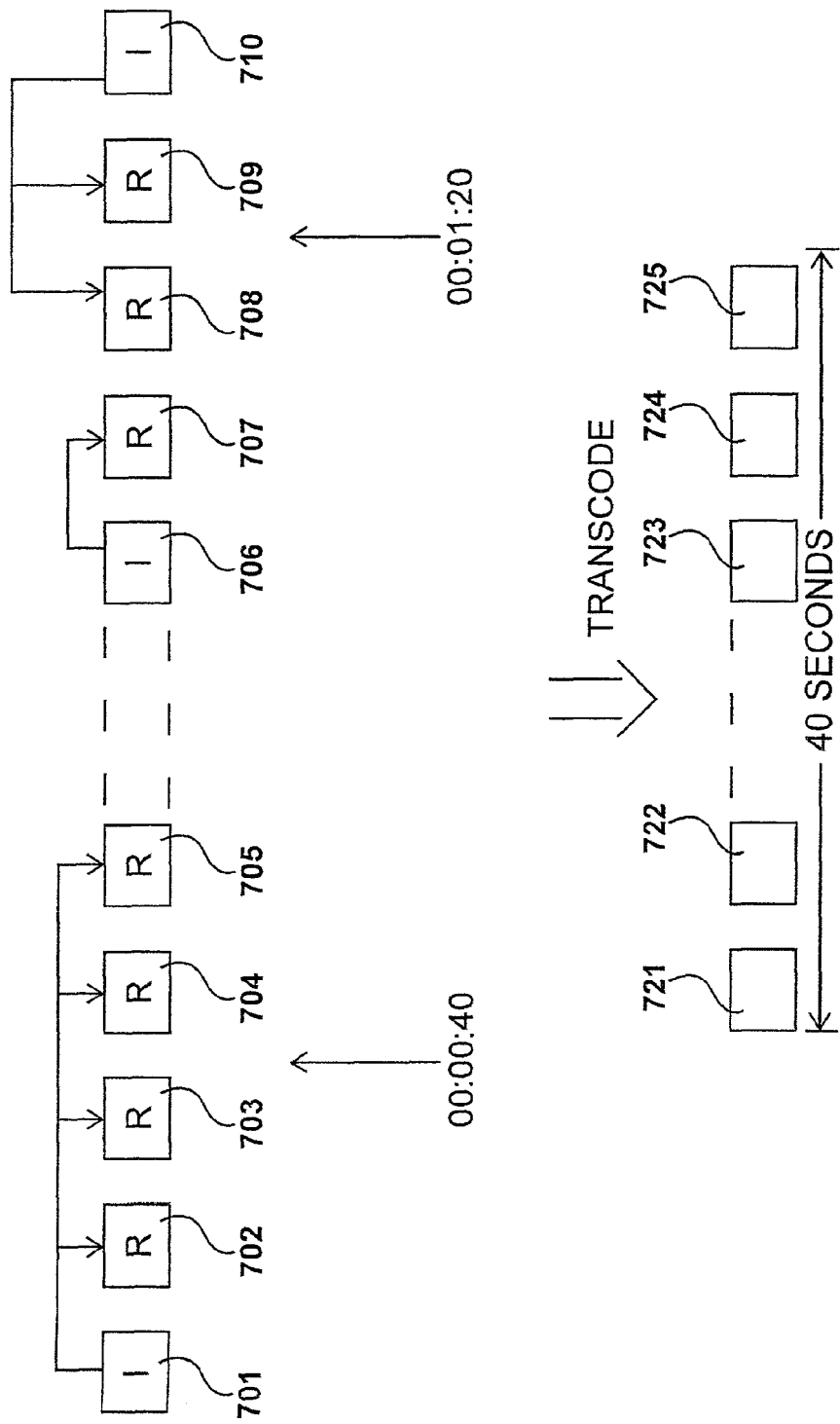
FIG. 7 illustrates a sequence of video frames.

In FIG. 7, a sequence of video frames is shown, representing frames within a segment. Frames 701 to 705 represent frames at the start of a segment and frames 706 to 710 represent frames at the end of the segment, with a plurality of frames at the centre of the segment not being shown. The frames shown in FIG. 7 are required in order to transcode material lying within the segment defined as 00:00:41 to 00:01:20. Thus, this represents a forty second segment. The position of the start of the segment is shown lying between frames 703 and 704. Similarly, the end point is shown as lying between frames 708 and 709. The transcoded material from the segment will include frames 721 and 722 at the start along with frames 723, 724 and 725 at the end. In the final output material, frame 721 will follow the final frame of the previous segment and frame 725 will precede the first frame of the next segment.

Many compression algorithms make use of spatial compression, reducing the amount of data to convey an individual frame without making reference to any other frames. Frames of this type are often identified as "I-frames", or infra-frames that may be viewed as individual frames without making reference to other frames in a temporal manner. Frames of this type are also often substantially similar to individual graphical frames produced as still images. Thus, within an MPEG stream, the I-frames may be considered as being substantially similar to JPEG images.

In addition to the spatially compressed I-frames, the video stream also includes relative frames, identified as "R- frames" in the embodiment shown. These relative frames have undergone spatial compression similar to the compression performed on the I-frames. In addition, further compression is achieved by storing only the differences between the frame under consideration and one or more other frames within a sequence. R-frames may also occur in different types. Thus, under some coding schemes, some of the R-frames will be identified as "P-frames" in which the temporal compressions are made with respect to previously transmitted frames in the sequence. In addition, some coding techniques deploy "B-frames" where greater compression is achieved by transmitting difference signals based on later frames in the sequence. Thus, when decoding it is only possible to decode these B-frames backwards, that is after a later transmitted frame has been received. It can therefore be appreciated that a level of buffering is required as part of many CODEC procedures.

As illustrated in FIG. 7, the segment starts at 00:00:41 therefore the first frame of interest should be 704. However, in this example, frame 704 is an R-frame and has therefore undergone temporal compression. The data contained within R-frame 704 merely represents differences between it and previous frame 703. Similarly, frame 703 only represents differences from frame 702 which again is an R-frame representing differences from frame 701.

For the purposes of illustration, in this example, frame 701 is considered to be an I-frame. Consequently if frame 704 is to be reconstituted, it is necessary to process frames 701, 702 and 703 in addition to the specific material received for frame 704. As a result, in order to perform the transcoding operation, frames 701 to 703 are processed in addition to processing frames 704 onwards.

At the end of the segment, the last frame to be considered should be frame 708. However, for the purposes of illustration, this frame is considered to be a B-frame derived from I-frame 710. Thus, in order to reconstitute frame 708, it is necessary to consider frames 709 and 710. Thus, an advantage of each transcoding processor receiving the totality of the video material is that the control process does not need to make any decisions as to where to segment the original source material. The control processor does divide the total duration by the total number of processors available but it does not divide the input material itself at these frame boundaries. As illustrated in FIG. 7, input frame 701 is required as source material for two output segments, as is input frame 710.

Figure 8:
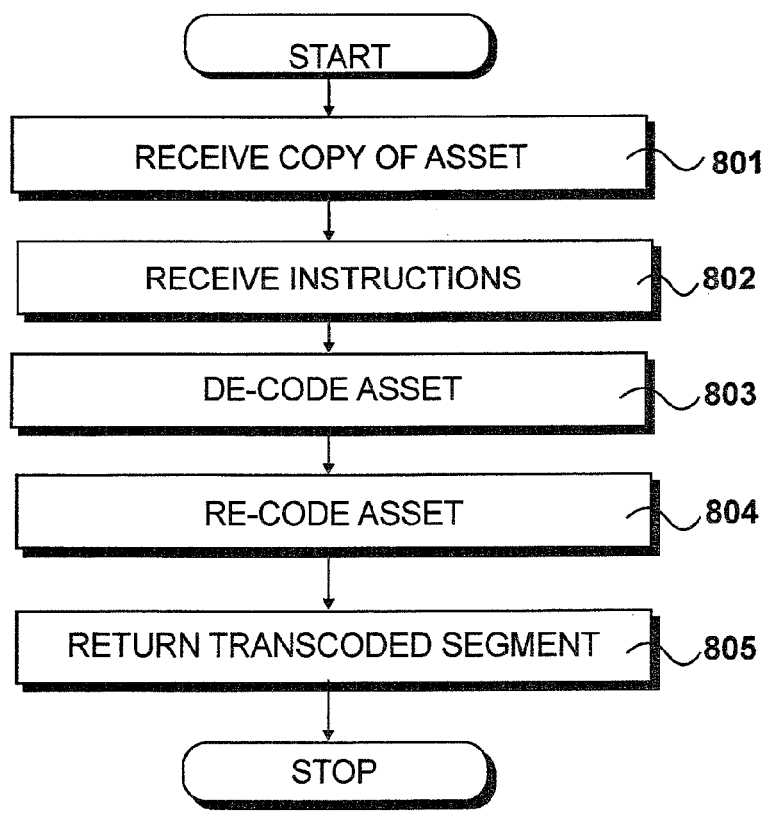
FIG. 8 details procedures performed by each of the transcoding processors.

Procedures performed at each of the transcoding processors are identified in FIG. 8. At step 801 a copy of the video asset is received in its totality and stored temporarily in volatile storage. Thus, each individual transcoding processor retains a copy of the entire video asset.

At step 802 specific instructions are received by each individual transcoding processor identifying the segment of video material to be transcoded.

At step 803 a decoding operation is performed in order to reconstitute original video frames within the instructed segment. Thus, following the previously described example, a sufficient number of frames within the original encoded video data are decoded in order to generate forty seconds of video data.

At step 804 the decoded video data is re-coded so as to be compatible with the requirements of the receiving station. Thereafter, at step 805 a transcoded segment is returned to the control processor.

I claim:

1. A method of transcoding video data involving a process of decoding coded video data and re-coding said video data, comprising the steps of:
 receiving input coded video data;
 simultaneously broadcasting a copy of the totality of said input coded video data to each one of a plurality of transcoding processors;
 instructing each one of said plurality of transcoding processors to transcode a time-based segment of its respective copy of the input coded video data to produce a respective transcoded segment;
 combining said transcoded segments to produce transcoded output video data; and
 supplying said output transcoded video data.

2. The method as claimed in claim 1, wherein said coded video data is in a compressed format that includes spatial compression and temporal compression.

3. The method as claimed in claim 1, wherein each one of said transcoding processors has access to a plurality of coding and decoding procedures collectively identified as CODECs.

4. The method as claimed in claim 1, wherein each one of said plurality of transcoding processors is further instructed to:
 identify image frames present within their respective time-based segment of the input coded video data as identified image frames; and
 decode additional image frames one of:
  before,
  after, and
  before and after said identified image frames to facilitate video decoding.

5. The method as claimed in claim 1, wherein:
 said plurality of transcoding processors represent all available transcoding processors which are instructed when the duration of said video data is greater than a predetermined minimum duration; and
 said plurality of transcoding processors represent a sub-set of said available transcoding processors when the duration of said video data is not greater than said predetermined minimum duration.

6. The method as claimed in claim 1, wherein said output transcoded video data is written to a cache.

7. The method as claimed in claim 6, wherein said cache is a randomly accessible solid state memory cache.

8. The method as claimed in claim 1, wherein said input coded video data has input coded audio data associated therewith and said input coded audio data is processed in combination with respective input coded video data.

9. A transcoding apparatus for decoding coded video data and recoding said video data, comprising:
 an input for receiving input coded video data;
 a plurality of transcoding processors;
 a distributor for simultaneously distributing a copy of the totality of said input coded video data to each one of said plurality of transcoding processors;
 a control processor arranged to instruct each one of said transcoding processors to transcode a time-based segment of said input coded video data to produce transcoded segments, and arranged to combine said transcoded segments; and
 an output for supplying output transcoded video data.

10. The apparatus as claimed in claim 9, wherein said input coded video data is in a compressed format that includes spatial compression and temporal compression.

11. The apparatus as claimed in claim 9, including storage having stored thereon a plurality of coding and decoding CODEC procedures, so that each of said transcoding processors has access to a plurality of said CODEC procedures.

12. The apparatus as claimed in claim 9, wherein each one of said plurality of transcoding processors identifies an instructed segment of the input video data including a plurality of image frames and decodes at least one of said plurality of image frames one of:
 before,
 after, and
 before and after said defined segment to facilitate video decoding.

13. The apparatus as claimed claim 9, wherein:
 said plurality of transcoding processors represent all available transcoding processors which are instructed when the duration of said video data is greater than a predetermined minimum duration; and
 said plurality of transcoding processors represent a sub-set of said available transcoding processors when the duration of said video data is not greater than said predetermined minimum duration.

14. The apparatus as claimed in claim 9, including solid state memory for caching previously decoded material.

15. The apparatus as claimed in claim 9, wherein time-based segments of audio material are processed in combination with their respective input coded video data.

16. A non-transitory computer-readable medium encoded with a computer program that, when executed by a computer, causes the computer to perform the steps of:
 receiving input coded video data;
 simultaneously supplying a copy of the totality of said input coded video data to each one of a plurality of transcoding processors;

instructing each one of said plurality of transcoding processors to transcode a time-based segment of its respective copy of the input coded video data to produce transcoded segments;

combining said transcoded segments to produce transcoded output video data; and supplying said output transcoded video data.

17. The non-transitory computer-readable medium as claimed in claim 16, wherein said coded video data is in a compressed format that includes spatial compression and temporal compression.

18. The non-transitory computer-readable medium as claimed in claim 16, wherein each one of said plurality of transcoding processors has access to a plurality of coding and decoding procedures collectably identified as CODECs.

19. The non-transitory computer-readable medium as claimed in claim 16, wherein each one of said plurality of transcoding processors is configured to identify image frames present within their respective time-based segment of the input coded video data as identified image frames and to decode additional image frames one of:

before, after, and before and after said identified image frames to facilitate video decoding.

20. The non-transitory computer-readable medium as claimed in claim 16, wherein:

said plurality of transcoding processors represent all available transcoding processors which are instructed when the duration of said video data is greater than a predetermined minimum duration; and said plurality of transcoding processors represent a subset of said available transcoding processors when the duration of said video data is not greater than said predetermined minimum duration.

* * * * *